US012802977B2

(12) United States Patent
Honma et al.

(10) Patent No.: US 12,802,977 B2
(45) Date of Patent: Nov. 17, 2026

(54) NEGATIVE ELECTRODE ACTIVE SUBSTANCE FOR SODIUM ION SECONDARY BATTERY

(71) Applicants: NIPPON ELECTRIC GLASS CO., LTD., Otsu (JP); NATIONAL UNIVERSITY CORPORATION NAGAOKA UNIVERSITY OF TECHNOLOGY, Nagaoka (JP)

(72) Inventors: Tsuyoshi Honma, Nagaoka (JP); Aoi Oda, Nagaoka (JP); Hideo Yamauchi, Otsu (JP); Ayumu Tanaka, Otsu (JP); Kei Tsunoda, Otsu (JP); Yoshinori Yamazaki, Otsu (JP)

(73) Assignees: NATIONAL UNIVERSITY CORPORATION NAGAOKA UNIVERSITY OF TECHNOLOGY, Niigata (JP); NIPPON ELECTRIC GLASS CO., LTD., Shiga (JP)

( * ) Notice: Subject to any disclaimer, the term of this patent is extended or adjusted under 35 U.S.C. 154(b) by 650 days.

(21) Appl. No.: 18/273,284

(22) PCT Filed: Feb. 14, 2022

(86) PCT No.: PCT/JP2022/005537

§ 371 (c)(1),
(2) Date: Jul. 20, 2023

(87) PCT Pub. No.: WO2022/176790

PCT Pub. Date: Aug. 25, 2022

(65) Prior Publication Data

US 2024/0313211 A1 Sep. 19, 2024

(30) Foreign Application Priority Data

Feb. 22, 2021 (JP) ................................ 2021-026016

(51) Int. Cl.

| | |
|---|---|
| ***H01M 4/52*** | (2010.01) |
| ***C03C 4/14*** | (2006.01) |
| ***C03C 14/00*** | (2006.01) |
| ***H01G 11/04*** | (2013.01) |
| ***H01G 11/46*** | (2013.01) |
| ***H01M 10/054*** | (2010.01) |

(52) U.S. Cl.

CPC ................ *H01M 4/52* (2013.01); *C03C 4/14* (2013.01); *C03C 14/006* (2013.01); *H01M 10/054* (2013.01); *C03C 2204/00* (2013.01); *C03C 2214/16* (2013.01); *H01G 11/04* (2013.01); *H01G 11/46* (2013.01)

(58) Field of Classification Search

CPC ...................................................... H01M 4/52

See application file for complete search history.

(56) References Cited

U.S. PATENT DOCUMENTS

| | | | | |
|---|---|---|---|---|
| 2018/0183044 | A1 | 6/2018 | Yamauchi | |
| 2020/0075950 | A1 * | 3/2020 | Yamauchi | H01M 10/0562 |
| 2021/0159547 | A1 | 5/2021 | Ikejiri et al. | |

FOREIGN PATENT DOCUMENTS

| | | | |
|---|---|---|---|
| CN | 108352530 | A | 7/2018 |
| CN | 110521036 | A | 11/2019 |
| JP | 2015-198000 | A | 11/2015 |
| JP | 2020-077615 | A | 5/2020 |
| WO | 2018/225494 | A1 | 12/2018 |

OTHER PUBLICATIONS

Official Communication issued in International Patent Application No. PCT/JP2022/005537, mailed on Apr. 26, 2022.

Omori et al., "Formation of bismuth metal in bismuth borate glass by reductive heat treatment and its electrochemical property as anode in lithium ion battery", Journal of the Ceramic Society of Japan 126, http://doi.org/10.2109/jcersj2.18083, Jul. 18, 2018, pp. 820-825.

Official Communication issued in corresponding Chinese Patent Application No. 202280016342.5, mailed on Jun. 25, 2026, 5 pages.

* cited by examiner

*Primary Examiner* — William D Young

(74) *Attorney, Agent, or Firm* — Keating & Bennett, LLP

(57) ABSTRACT

A negative electrode active material for a sodium ion secondary battery is provided, in which the negative electrode active material has a low initial irreversible capacity. The negative electrode active material for a sodium ion secondary battery includes a crystallized glass formed by precipitation of metallic Bi in a matrix containing at least one compound selected from $Fe_2O_3$ and CuO, and $SiO_2$.

2 Claims, No Drawings

NEGATIVE ELECTRODE ACTIVE SUBSTANCE FOR SODIUM ION SECONDARY BATTERY

TECHNICAL FIELD

The present invention relates to a negative electrode active material for a sodium ion secondary battery used in, for example, a portable electronic device or an electric vehicle.

BACKGROUND ART

In recent years, in association with the increasing adoption of portable electronic devices, electric vehicles, and the like, development of lithium ion secondary batteries have been very active. However, concerns exist regarding the depletion of Li resources used in lithium ion secondary batteries, and as a solution to this concern, sodium ion secondary batteries in which Li ions are replaced with Na ions are being examined.

When metallic Bi forms an alloy with sodium, it has a high theoretical capacitance of 385 mAhg, and therefore metallic Bi is widely accepted as a promising candidate for a negative electrode material in a sodium ion secondary battery (see, for example, Patent Document 1). In association with charging and discharging, metallic Bi repeatedly undergoes a reaction of $Bi+3Na^{+}+3e^{-}\longleftrightarrow BiNa_3$. Here, since metallic Bi has a large volume change of 2.4 times in association with the formation of an alloy during charging and discharging, a decrease in capacitance due to destruction of the electrode becomes a problem. As a method of mitigating this volume change during charging and discharging, a method of precipitating metallic Bi in a glass matrix has been proposed (for example, see Patent Document 2 and Non-Patent Document 1).

CITATION LIST

Patent Literature

Patent Document 1: JP 2015-198000 A
Patent Document 2: JP 2020-077615 A

Non-Patent Document

Non-Patent Document 1: Y. Omori, et. al, Journal of the Ceramic Society of Japan, 126, pp. 820 to 825 (2018)

SUMMARY OF INVENTION

Technical Problem

In crystallized glass formed by precipitation of metallic Bi, amorphous components such as $SiO_2$, $P_2O_5$, and $B_2O_3$ contained in the glass matrix act as a buffer material for mitigating expansion and contraction of the Bi component. However, a problem with such crystallized glass is that Na ions are absorbed in these amorphous components at the time of initial charging and this absorption is likely to cause initial irreversible capacity.

The present invention was developed in view of the above circumstances, and an object thereof is to provide a negative electrode active material for a sodium ion secondary battery, the negative electrode active material having a low initial irreversible capacity.

Solution to Problem

A negative electrode active material for a sodium ion secondary battery of the present invention includes a crystallized glass formed by precipitation of metallic Bi in a matrix containing at least one compound selected from $Fe_2O_3$ and CuO, and $SiO_2$.

The negative electrode active material for a sodium ion secondary battery of the present invention contains, in the matrix, at least one compound selected from $Fe_2O_3$ and CuO. The $Fe_2O_3$ and CuO function themselves as active materials that absorb and release Na ions and electrons, and therefore the initial irreversible capacity resulting from absorption of Na ions by the matrix can be suppressed, and as a result, the initial charging and discharging efficiency can be improved. Further, $Fe_2O_3$ and CuO are components that function as network-forming oxides and promote amorphization. As a result, $Fe_2O_3$ and CuO function as components that mitigate the expansion and contraction of the Bi component, and can also improve the cycle characteristics. $Fe_2O_3$ also facilitates an electron transfer associated with the absorption and release of Na ions by metallic Bi while the electrons hop on Fe ions as in $Fe^{2+}$—O—$Fe^{3+}\longleftrightarrow Fe^{3+}$—O—$Fe^{2+}$ between Fe ions, and therefore $Fe_2O_3$ has a function of improving the conductivity of the oxide matrix component. CuO also has a function of improving the conductivity of the oxide matrix component by absorbing Na ions and electrons during charging to thereby form metallic Cu. This also improves rapid charging and discharging characteristics.

The negative electrode active material for a sodium ion secondary battery of the present invention preferably contains, in terms of mol % of the following oxides, from 30% to 90% of $Bi_2O_3$, from 2% to 30% of $SiO_2$, and from 4% to 50% of $Fe_2O_3$+CuO.

In the negative electrode active material for a sodium ion secondary battery of the present invention, metallic Cu is preferably further precipitated in the matrix.

Advantageous Effects of Invention

According to the present invention, a negative electrode active material for a sodium ion secondary battery can be provided with the negative electrode active material having a low initial irreversible capacity.

DESCRIPTION OF EMBODIMENTS

A negative electrode active material for a sodium ion secondary battery of the present invention (hereinafter, also simply referred to as a negative electrode active material) includes crystallized glass formed by precipitation of metallic Bi in a matrix containing at least one compound selected from $Fe_2O_3$ and CuO, and $SiO_2$. Specifically, the negative electrode active material of the present invention preferably contains, in terms of mol % of the following oxides, from 30% to 90% of $Bi_2O_3$, from 2% to 30% of $SiO_2$, and from 4% to 50% of $Fe_2O_3$+CuO. The reason for limiting the composition in this manner is described below. Note that in the description of the composition below, "%" means "mol %" unless otherwise indicated.

$Bi_2O_3$ is an active material component that serves as a site for absorbing and releasing sodium ions. The content of the $Bi_2O_3$ is preferably from 30% to 90%, from 40% to 80%, from 50% to 75%, or from 60% to 70% and is particularly preferably from 65% to 68%. When the content of the $Bi_2O_3$ is too small, the charging/discharging capacity per unit mass of the negative electrode active material tends to decrease. On the other hand, when the content of the $Bi_2O_3$ is too large, the amorphous component in the negative electrode active material becomes relatively small. Therefore, the volume change accompanying the absorption and release of sodium ions during charging and discharging cannot be mitigated, and the cycle characteristics are likely to decrease.

$SiO_2$ is a component that functions as a network-forming oxide and promotes amorphization. Therefore, $SiO_2$ has an effect of entrapping the sodium ion absorption and release sites in the Bi component and thereby improving the cycle characteristics. The content of the $SiO_2$ is preferably from 2% to 30%, or from 5% to 20%, and is particularly preferably from 7% to 15%. When the content of the $SiO_2$ is too small, the effects described above are difficult to achieve. On the other hand, when the content of the $SiO_2$ is too large, ion conductivity tends to decrease, and the discharging capacity tends to be reduced. In addition, since the amount of the Bi component is relatively reduced, the charging/discharging capacity tends to be reduced.

$Fe_2O_3$ and CuO are components that function as active materials that absorb and release Na ions and electrons. In addition, $Fe_2O_3$ and CuO are components that function as network-forming oxides and promote amorphization. As a result, $Fe_2O_3$ and CuO function as components that mitigate the expansion and contraction of the Bi component, and have an effect of improving the cycle characteristics. Furthermore, $Fe_2O_3$ and CuO also have a function of improving the conductivity of the oxide matrix component in the negative electrode active material, and also have an effect of improving rapid charging and discharging characteristics. The content of $Fe_2O_3$+CuO is preferably from 4% to 50%, from 4% to 45%, or from 10% to 30%, and is particularly preferably from 15% to 25%. When the content of $Fe_2O_3$+CuO is too small, the above effects are difficult to obtain. On the other hand, when the content of $Fe_2O_3$+CuO is too large, the ion conductivity tends to decrease, and the discharging capacity tends to be reduced.

The negative electrode active material of the present invention may contain the following components in addition to the components described above.

$Na_2O$ is a component that improves the ion conductivity of the oxide matrix other than the Bi component. The content of $Na_2O$ is preferably from 0% to 50%, from 1% to 45%, from 3% to 43%, or from 5% to 40%, and is particularly preferably from 7% to 35%. When the content of $Na_2O$ is too large, a large amount of other crystals (for example, crystals containing $Na_2O$ and $SiO_2$) are formed, and the cycle characteristics are easily reduced.

Similarly to $SiO_2$, $P_2O_5$ is a component that functions as a network-forming oxide and promotes amorphization. Therefore, $P_2O_5$ has an effect of entrapping the sodium ion absorption and release sites in the Bi component and thereby improving the cycle characteristics. The content of $P_2O_5$ is preferably from 0% to 30%, from 2% to 30%, or from 5% to 20%, and is particularly preferably from 7% to 15%. When the $P_2O_5$ content is too large, the water resistance of the negative electrode active material tends to decrease. In addition, since the amount of the Bi component becomes relatively small, the charging/discharging capacity tends to be reduced.

$B_2O_3$ is also a component which, similarly to $SiO_2$, functions as a network-forming oxide and promotes amorphization. Therefore, $B_2O_3$ has an effect of entrapping the sodium ion absorption and release sites in the Bi component and thereby improving the cycle characteristics. The content of $B_2O_3$ is preferably from 0% to 30%, from 2% to 30%, or from 5% to 20%, and is particularly preferably from 7% to 15%. When the content of $B_2O_3$ is too large, the coordination bond to the Bi component becomes strong, and the initial charging capacity increases, and as a result, the initial irreversible capacity tends to increase. In addition, since the amount of the Bi component becomes relatively small, the charging/discharging capacity tends to be reduced.

The content of $P_2O_5$+$SiO_2$+$B_2O_3$ is preferably from 2% to 30% or from 5% to 20%, and is particularly preferably from 7% to 15%. If the content of $P_2O_5$+$SiO_2$+$B_2O_3$ is too small, the volume change of the Bi component in association with the absorption and release of sodium ions during charging and discharging cannot be mitigated, and structural deterioration occurs, and therefore the cycle characteristics are likely to decrease. On the other hand, when the content of $P_2O_5$+$SiO_2$+$B_2O_3$ is too large, the charging/discharging capacity tends to decrease because the Bi component becomes relatively small. Note that "x+y+ . . . " as used herein refers to a total content of the components. Here, each component does not necessarily need to be contained as an essential component, and a component which is not contained (that is, whose content is 0%) may be included.

The negative electrode active material of the present invention may contain $TiO_2$, MnO, ZnO, MgO, CaO, and $Al_2O_3$ at a total amount in a range from 0% to 25%, from 0% to 23%, from 0% to 21%, or from 0.1% to 20%. An amorphous material is easily obtained by containing these components. However, if the content is too large, the network composed of $SiO_2$ is prone to interruption, and as a result, the volume change of the negative electrode active material in association with charging and discharging cannot be mitigated, and the cycle characteristics may be deteriorated.

Metallic Bi is precipitated inside the negative electrode active material of the present invention. Metallic Bi can be identified by powder X-ray diffraction (XRD) measurements using CuKα radiation. Specifically, in a diffraction line profile obtained by measurements, diffraction lines having peak positions at 20 values of 27.2°, 37.9°, and 39.6° C. an be attributed to the crystalline phase (hexagonal system, space group R-3 m (166)) of metallic Bi. In terms of mass %, the amount of crystals of metallic Bi is preferably from 40% to 99.9%, from 40% to 90%, from 40% to 75%, from 45% to 70%, or from 50% to 65% by mass. When the amount of crystals of metallic Bi is too large, the volume expansion of the negative electrode active material becomes large when Na ions are absorbed during initial charging, and cracks are generated in the electrode, resulting in loss of electron conduction, and an increase in the irreversible capacity. On the other hand, if the amount of metallic Bi crystals is too small, the irreversible capacity tends to increase.

Metallic Cu may be precipitated inside the negative electrode active material of the present invention. The metallic Cu has an effect of improving the conductivity of the oxide matrix component and also of improving the discharging capacity and the rapid charging and discharging characteristics. Metallic Cu can be identified by powder X-ray diffraction (XRD) measurements using CuKα radiation. Specifically, in a diffraction line profile obtained by measurements, diffraction lines having peak positions at 20 values of 43.6° and 50.7° can be attributed to the crystalline phase (cubic system, space group Fm-3m) of metallic Cu. In terms of mass %, the amount of crystals of the metallic Cu is preferably from 0% to 20%, from 3% to 20%, from 5% to 15%, or from 7% to 12%. When the content of the metallic Cu crystals is too large, the ion conductivity decreases, and thus the discharging capacity tends to decrease.

$Bi_2O_3$ crystals or $CuBi_2O_4$ may be precipitated inside the negative electrode active material of the present invention. Since these materials function as active materials, the discharging capacity can be further improved.

The crystallinity of the negative electrode active material is preferably 30% or more or 40% or more, and is particularly preferably 50% or more. As the crystallinity increases, the initial irreversible capacity is more easily reduced. However, when the crystallinity is too large, the cycle characteristics tend to deteriorate. Therefore, from the viewpoint of enhancing the cycle characteristics, the crystallinity is preferably 99% or less, and is particularly preferably 95% or less.

The crystallinity is determined from a diffraction line profile at a 2θ value of from 10 to 60° obtained by powder X-ray diffraction measurements using CuKα radiation. Specifically, from the total scattering curve obtained by subtracting the background from the diffraction line profile, the integrated intensity, denoted by Ia, is determined by peak separating a broad diffraction line (amorphous halo) at 10 to 45°, and the sum of integrated intensities, denoted by Ic, is determined by peak separation of each crystalline diffraction lines originating from crystals and detected at 10 to 60°. The degree of crystallinity Xc is obtained from the following equation.

$$Xc=[Ic/(Ic+Ia)]\times 100(\%)$$

The form of the negative electrode active material is not particularly limited, but is usually a powder form. The average particle size of the negative electrode active material is preferably from 0.1 μm to 20 μm, from 0.2 μm to 15 μm, or from 0.3 μm to 10 μm, and is particularly preferably from 0.5 μm to 5 μm. The maximum particle size of the negative electrode active material is preferably 150 μm or less, 100 μm or less, or 75 μm or less, and is particularly preferably 55 μm or less. When the average particle size or the maximum particle size is too large, the volume change of the negative electrode active material in association with the absorption and release of sodium ions when charging and discharging cannot be mitigated, and the cycle characteristics tend to be significantly deteriorated. On the other hand, if the average particle size is too small, the dispersion of the powder becomes poor when the powder is formed into a paste, and producing a uniform electrode tends to be difficult. In addition, the precipitated metallic Bi is easily oxidized by oxygen in the air.

Here, the average particle size refers to the median size D50 (50% volume cumulative size) of primary particles, and the maximum particle size refers to the D90 (90% volume cumulative size) size of the primary particles, and are both values measured using a laser diffraction particle size analyzer.

In order to obtain a powder having a predetermined size, a general pulverizer or classifier is used. For example, a mortar, a ball mill, a vibrating ball mill, a satellite ball mill, a planetary ball mill, a jet mill, a sieve, centrifugal separation, air classification, or the like is used.

The negative electrode active material of the present invention can be produced by subjecting an oxide material as a raw material to a heating treatment while supplying a reducing gas. Through this, $Bi_2O_3$ contained in the oxide material is reduced to metallic Bi.

The oxide material is produced by heating and melting the raw material powder, which has been prepared to have the composition described above, at a temperature of, for example, from 600° C. to 1200° C. to form a homogeneous melt, and then cooling and solidifying the melt. The obtained melt-solidified product is subjected to post-processing such as pulverization and classification as necessary.

The oxide material is preferably amorphous, and thus the negative electrode active material of the present invention composed of crystallized glass in which metallic Bi is precipitated in a matrix containing at least one compound selected from $Fe_2O_3$ and CuO, and $SiO_2$ can be easily obtained. Crystals such as $Bi_2O_3$ and $Cu_2O$ may be precipitated inside the oxide material.

Similarly to the negative electrode active material, the oxide material is usually in the form of powder. The average particle size of the oxide material is preferably from 0.1 μm to 20 μm, from 0.2 μm to 15 μm, or from 0.3 μm to 10 μm, and is particularly preferably from 0.5 μm to 5 μm. In addition, the maximum particle size of the oxide material is preferably 150 μm or less, 100 μm or less, or 75 μm or less, and is particularly preferably 55 μm or less. When the average particle size or the maximum particle size is too large, the grain size of the obtained negative electrode active material also becomes large, and thus the problems described above tend to occur. In addition, $Bi_2O_3$ may not be sufficiently reduced to metallic Bi by the reducing gas. On the other hand, when the average particle size is too small, the grain size of the obtained negative electrode active material is also reduced, and thus the problems described above tend to occur.

The temperature of the heating treatment is preferably 250° C. or higher, or 300° C. or higher, and is particularly preferably 400° C. or higher. If the heating temperature is too low, the $Bi_2O_3$ in the oxide material is less likely to be reduced to metallic Bi because the thermal energy that is imparted is small. Note that the upper limit of the heating temperature is not particularly limited. However, if the heating temperature is too high, the reduced metallic Bi particles are likely to become coarse, and the cycle characteristics of the negative electrode active material may be significantly deteriorated. Therefore, the heating temperature is preferably 700° C. or lower, and is particularly preferably 600° C. or lower.

The heating time is preferably from 20 minutes to 1000 minutes, and is particularly preferably from 60 minutes to 500 minutes. If the heating time is too short, the $Bi_2O_3$ in the oxide material is less likely to be reduced to metallic Bi because the thermal energy that is imparted is small. On the other hand, when the heating time is too long, the reduced metallic Bi particles are likely to become coarse, and the cycle characteristics of the negative electrode active material may be significantly deteriorated.

For the heating treatment, an electric heating furnace, a rotary kiln, a microwave heating furnace, a high-frequency heating furnace, or the like can be used.

Examples of the reducing gas include at least one gas selected from $H_2$, $NH_3$, CO, $H_2S$, and $SiH_4$. From the viewpoint of handling ease, at least one gas selected from $H_2$, $NH_3$, and CO is preferable, and $H_2$ is particularly preferable.

When $H_2$ is used as the reducing gas, the $H_2$ is preferably mixed with an inert gas such as $N_2$ or Ar for use, to suppress the risk of explosion or the like. The mixing ratio of the inert gas and $H_2$ is, by vol %, preferably from 90% to 99.5% of the inert gas and from 0.5% to 10% of $H_2$, more preferably from 92% to 99% of the inert gas and from 1% to 8% of $H_2$, and even more preferably from 96% to 99% of the inert gas and from 1% to 4% of $H_2$.

In the heating treatment step, the oxide material (oxide material powder) tends to soften and flow to form aggregates. When the oxide material forms an aggregate, it becomes difficult for the reducing gas to spread over the entire oxide material, and therefore reduction of the oxide material tends to require a long time. Alternatively, the produced negative electrode active material particles may become coarse, and the battery characteristics may be deteriorated. Therefore, it is preferable to add an aggregation inhibitor when the oxide material is subjected to heat treatment. In this manner, aggregation of the oxide material during the heating treatment can be suppressed, and the $Bi_2O_3$ in the oxide material can be reduced to metallic Bi in a short amount of time.

Examples of the aggregation inhibitor include a carbon material such as conductive carbon and acetylene black. Since the carbon material has electron conductivity, conductivity can also be imparted to the negative electrode active material. Among these carbon materials, acetylene black having excellent electron conductivity is preferable.

The oxide material and the aggregation inhibitor are preferably mixed at a ratio of, in terms of mass %, from 80% to 99.5% of the oxide material and from 0.5% to 20% of the aggregation inhibitor. In this manner, a negative electrode active material having good initial charging characteristics and stable cycle characteristics is easily obtained.

A binder and a conductive aid are added to the negative electrode active material of the present invention, and this can be used as a negative electrode material.

Examples of the binder include cellulose derivatives such as carboxymethyl cellulose, hydroxypropyl methyl cellulose, hydroxypropyl cellulose, hydroxyethyl cellulose, ethyl cellulose, and hydroxymethyl cellulose; water-soluble polymers such as polyvinyl alcohol; thermosetting resins such as thermosetting polyimide, phenol resin, epoxy resin, urea resin, melamine resin, unsaturated polyester resin, and polyurethane; and polyvinylidene fluoride.

Examples of the conductive aid include highly conductive carbon black such as acetylene black and ketjen black; carbon powder such as graphite; and carbon fiber.

The negative electrode material for a power storage device can be applied onto a surface of a metal foil or the like serving as a current collector, and used as a negative electrode for a power storage device.

The negative electrode active material for a sodium ion secondary battery of the present invention can also be employed in a hybrid capacitor or the like in which a negative electrode active material used for a sodium ion secondary battery is combined with a positive electrode material for a non-aqueous electric double layer capacitor.

A sodium ion capacitor, which is a hybrid capacitor, is one type of asymmetric capacitor in which the charging and discharging principles of the positive electrode and the negative electrode are different. The sodium ion capacitor has a structure in which a negative electrode for a sodium ion secondary battery and a positive electrode for an electric double layer capacitor are combined. Here, the positive electrode forms an electric double layer on the surface and charges and discharges using a physical action (electrostatic action), whereas the negative electrode charges and discharges through a chemical reaction (absorption and release) of Na ions, similar to the case of a sodium ion secondary battery.

For the positive electrode of the sodium ion capacitor, a positive electrode active material composed of a carbonaceous powder having a high specific surface area such as activated carbon, polyacene, or mesophase carbon is used. On the other hand, the negative electrode active material of the present invention can be used in the negative electrode.

EXAMPLES

Hereinafter, the present invention will be described in detail based on examples, but the present invention is not limited to these examples.

Tables 1 and 2 present Examples 1 to 18 and Comparative Examples 1 and 2.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| Oxide Material | Composition (mol %) | $Bi_2O_3$ | 80 | 75 | 70 | 66 | 65 | 60 | 60 | 60 |
| | | $Fe_2O_3$ | 5 | 10 | 15 | 21 | 20 | 25 | | |
| | | $SiO_2$ | 15 | 15 | 15 | 13 | 15 | 15 | 40 | 40 |
| | Amorphous content (mass %) | | 87 | 96 | 100 | 100 | 100 | 100 | 100 | 100 |
| | Precipitated crystal | | $Bi_2O_3$ | $Bi_2O_3$ | — | — | — | — | — | — |
| | Heat treatment conditions | | 450° C. 30 minutes $N_2$:$H_2$ = 97:3 | 475° C. 3 hours $N_2$:$H_2$ = 97:3 | 500° C. 12 hours $N_2$:$H_2$ = 97:3 | 500° C. 12 hours $N_2$:$H_2$ = 97:3 | 510° C. 3 hours $N_2$:$H_2$ = 97:3 | 525° C. 3 hours $N_2$:$H_2$ = 97:3 | 480° C. 10 hours $N_2$:$H_2$ = 97:3 | 480° C. 3 hours Air |
| Negative electrode active material | Crystal seed | | Bi | Bi | Bi | Bi | Bi | Bi | Bi | $Bi_2O_3$ |
| | Crystallinity (mass %) | | 60 | 92 | 99 | 99 | 95 | 97 | 21 | 18 |
| Battery characteristics | Initial discharging capacity (mAh/g) | | 312 | 324 | 333 | 340 | 341 | 352 | 210 | 180 |
| | Initial irreversible capacity (mAh/g) | | 190 | 151 | 80 | 70 | 81 | 72 | 238 | 308 |

TABLE 2

| | | | Example 7 | Example 8 | Example 9 | Example 10 | Example 11 | Example 12 |
|---|---|---|---|---|---|---|---|---|
| Oxide material | Composition (mol %) | $Bi_2O_3$ | 80 | 75 | 70 | 65 | 60 | 55 |
| | | $Fe_2O_3$ | | | | | | |
| | | CuO | 5 | 10 | 15 | 20 | 25 | 30 |
| | | $SiO_2$ | 15 | 15 | 15 | 15 | 15 | 15 |

TABLE 2-continued

| | | | | | | | |
|---|---|---|---|---|---|---|---|
| | | Amorphous content (mass %) | 87 | 100 | 100 | 100 | 100 | 100 |
| | | Precipitated crystal | $Bi_2O_3$ | — | — | — | — | — |
| | | Heat treatment conditions | 500° C. 3 hours $N_2$:$H_2$ = 97:3 | 500° C. 3 hours $N_2$:$H_2$ = 97:3 | 500° C. 3 hours $N_2$:$H_2$ = 97:3 | 500° C. 3 hours $N_2$:$H_2$ = 97:3 | 500° C. 3 hours $N_2$:$H_2$ = 97:3 | 500° C. 3 hours $N_2$:$H_2$ = 97:3 |
| Negative electrode active material | | Crystal seed | 43 | 52 | 62 | 65 | 61 | 62 |
| | | Metallic Bi crystal amount (mass %) | Bi, Cu, $Bi_2O_3$ | Bi, Cu, $Bi_2O_3$ | Bi, Cu, $CuBi_2O_4$, $Bi_2O_3$ | Bi, Cu, $CuBi_2O_4$, $Bi_2O_3$ | Bi, Cu, $Bi_2O_3$ | Bi, Cu, $Bi_2O_3$ |
| | | Metallic Cu crystal amount (mass %) | 4 | 6 | 7 | 7 | 10 | 12 |
| | | $CuBi_2O_4$ crystal amount (mass %) | 0 | 0 | 3 | 6 | 0 | 0 |
| | | $Bi_2O_3$ crystal amount (mass %) | 31 | 29 | 17 | 15 | 24 | 22 |
| | | Total crystallinity (mass %) | 78 | 87 | 89 | 93 | 95 | 96 |
| Battery characteristics | | Initial discharging capacity (mAh/g) | 313 | 309 | 313 | 316 | 321 | 325 |
| | | Initial irreversible capacity (mAh/g) | 174 | 152 | 128 | 136 | 132 | 131 |

| | | | Example 13 | Example 14 | Example 15 | Example 16 | Example 17 | Example 18 |
|---|---|---|---|---|---|---|---|---|
| Oxide material | Composition (mol %) | $Bi_2O_3$ | 50 | 45 | 40 | 60 | 55 | 60 |
| | | $Fe_2O_3$ | | | | 10 | 15 | 15 |
| | | CuO | 35 | 40 | 45 | 15 | 15 | 10 |
| | | $SiO_2$ | 15 | 15 | 15 | 15 | 15 | 15 |
| | | Amorphous content (mass %) | 94 | 72 | 86 | 100 | 100 | 100 |
| | | Precipitated crystal | $Bi_2O_3$ | $Bi_2O_3$, $Cu_2O$ | $Bi_2O_3$, $Cu_2O$ | — | — | — |
| | | Heat treatment conditions | 500° C. 3 hours $N_2$:$H_2$ = 97:3 | 500° C. 3 hours $N_2$:$H_2$ = 97:3 | 500° C. 3 hours $N_2$:$H_2$ = 97:3 | 500° C. 3 hours $N_2$:$H_2$ = 97:3 | 500° C. 3 hours $N_2$:$H_2$ = 97:3 | 500° C. 3 hours $N_2$:$H_2$ = 97:3 |
| Negative electrode active material | | Crystal seed | 58 | 55 | 55 | 66 | 69 | 68 |
| | | Metallic Bi crystal amount (mass %) | Bi, Cu, $Bi_2O_3$ | Bi, Cu, $Bi_2O_3$ | Bi, Cu, $Bi_2O_3$ | Bi, Cu, $Bi_2O_3$ | Bi, Cu, $Bi_2O_3$ | Bi, Cu, $Bi_2O_3$ |
| | | Metallic Cu crystal amount (mass %) | 15 | 18 | 20 | 5 | 1 | 2 |
| | | $CuBi_2O_4$ crystal amount (mass %) | 0 | 0 | 0 | 0 | 0 | 0 |
| | | $Bi_2O_3$ crystal amount (mass %) | 25 | 25 | 24 | 17 | 8 | 13 |
| | | Total crystallinity (mass %) | 98 | 98 | 99 | 88 | 81 | 83 |
| Battery characteristics | | Initial discharging capacity (mAh/g) | 331 | 338 | 344 | 307 | 308 | 302 |
| | | Initial irreversible capacity (mAh/g) | 126 | 129 | 128 | 137 | 148 | 143 |

(1) Production of Oxide Material

Raw material powders were prepared using various oxide raw materials, various carbonate raw materials, and the like so as to obtain the compositions described in Tables 1 and 2. For each obtained raw material powder, the raw material powder was charged into a melting container and melted at 1100° C. in air in an electric heating furnace, and then poured between a pair of cooling rollers to form a film. The obtained film-shaped molded product was pulverized with a ball mill to prepare an oxide material powder having an average particle size of 2 μm. The amorphous content and the precipitated crystals were examined by XRD, and the obtained results are presented in Tables 1 and 2.

(2) Production of Negative Electrode Active Material

The obtained oxide material powder was heat-treated under the conditions described in Tables 1 and 2. In Tables 1 and 2, "$N_2$:$H_2$=97:3" means a mixed gas atmosphere of 97 vol % of $N_2$ and 3 vol % of $H_2$. The heat-treated oxide material was crushed using a mortar and pestle, and a negative electrode active material powder having an average particle size of 2 μm was obtained. The structure of the negative electrode active material was examined by XRD, and the results indicated that the crystals presented in Tables 1 and 2 were precipitated.

(3) Production of Negative Electrode

The negative electrode active material powder, a conductive aid (acetylene black), and a binder (carboxymethyl cellulose) were weighed to have a mass ratio of 78:5:17, and pure water was added thereto to form slurry. An aluminum foil was coated with the obtained slurry, and this was vacuum-dried with a dryer at 70° C., and then pressed between a pair of rotating rollers to obtain an electrode sheet. The electrode sheet was then punched to a diameter of 11 mm using an electrode punching machine, and a negative electrode was produced.

(4) Production of Test Battery

The obtained negative electrode, a separator made from a polypropylene porous film with a diameter of 16 mm and dried under reduced pressure at 70° C. for 8 hours, and metallic sodium as a counter electrode were laminated and impregnated with an electrolytic solution, and thereby a test battery was produced. A solution of a 1M $NaPF_6$ solution/EC:DEC=1:1 (EC=ethylene carbonate, DEC=diethyl carbonate) was used as an electrolytic solution. The test battery was assembled in an argon environment having a dew point temperature of −70° C. or lower.

(5) Charge/Discharge Test

The produced test batteries were each subjected to charging in constant current (CC) mode (absorption of sodium ions into the negative electrode active material) from an open circuit voltage to 0 V at 30° C., and the amount of electricity (initial charging capacity) charged to a unit mass of the negative electrode active material was determined.

Next, the test battery was discharged in CC mode (release of sodium ions from the negative electrode active material) from 0 V to 3 V, and the amount of electricity (initial discharging capacity) discharged from a unit mass of the negative electrode active material was determined. Note that the C-rate was set to 0.1 C. From these results, the initial irreversible capacity (=initial charging capacity−initial discharging capacity) was determined. The results are shown in Tables 1 and 2.

As shown in Tables 1 and 2, in Examples 1 to 18, metallic Bi was precipitated in the matrix containing at least one compound selected from $Fe_2O_3$ and CuO, and $SiO_2$, and therefore the initial discharge capacities were high in a range from 302 to 352 mAh/g, and the initial irreversible capacities were low in a range from 70 to 190 mAh/g. On the other hand, the compositions of Comparative Examples 1 and 2 did not contain $Fe_2O_3$ or CuO, and therefore the initial discharging capacities were low in a range from 180 to 210 mAh/g, and the initial irreversible capacities were high in a range from 238 to 308 mAh/g.

INDUSTRIAL APPLICABILITY

The negative electrode active material of the present invention is suitable for use in a sodium ion secondary battery used in, for example, a main power source or the like for mobile communication devices, portable electronic devices, electric bicycles, electric two wheeled vehicles, electric vehicles, and the like.

The invention claimed is:

1. A negative electrode active material for a sodium ion secondary battery, the negative electrode active material comprising a crystallized glass formed by precipitation of metallic Bi and metallic Cu in a matrix containing at least one compound selected from $Fe_2O_3$ and CuO, and $SiO_2$.

2. The negative electrode active material for a sodium ion secondary battery according to claim 1, wherein the negative electrode active material comprises, in terms of mol % of the following oxides, from 30% to 90% of $Bi_2O_3$, from 2% to 30% of $SiO_2$, and from 4% to 50% of $Fe_2O_3$+CuO.

* * * * *